L. C. ARNAUD.
FRICTIONAL GEARING.
APPLICATION FILED FEB. 24, 1909.
939,653.
Patented Nov. 9, 1909.
2 SHEETS—SHEET 1.
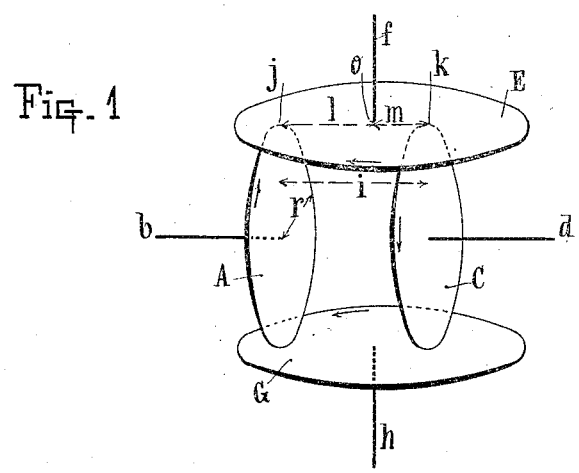
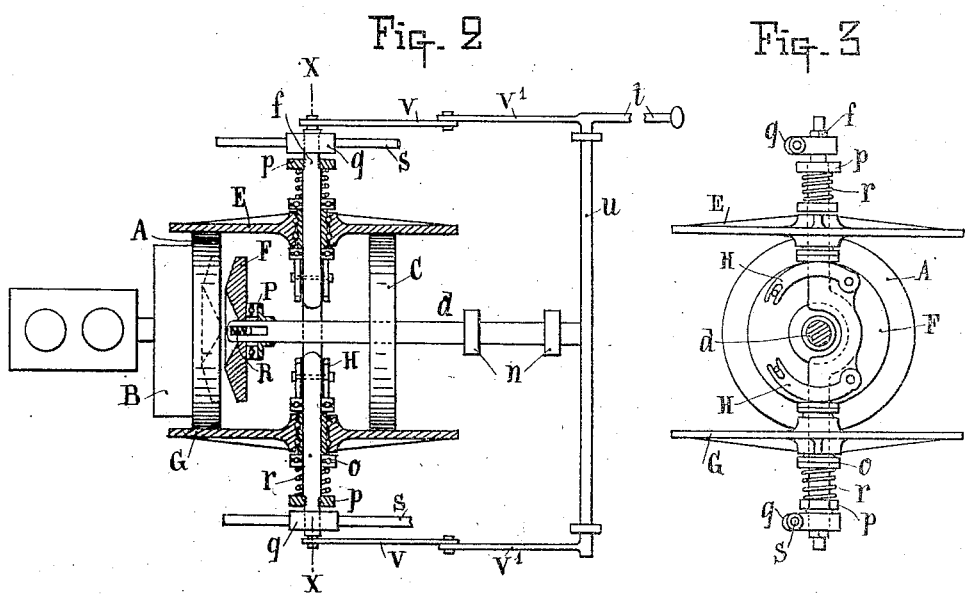
Witnesses
F. Stern
H C Hunsberger
Inventor
Louis Camille Arnaud
by B. Singer
Attorney

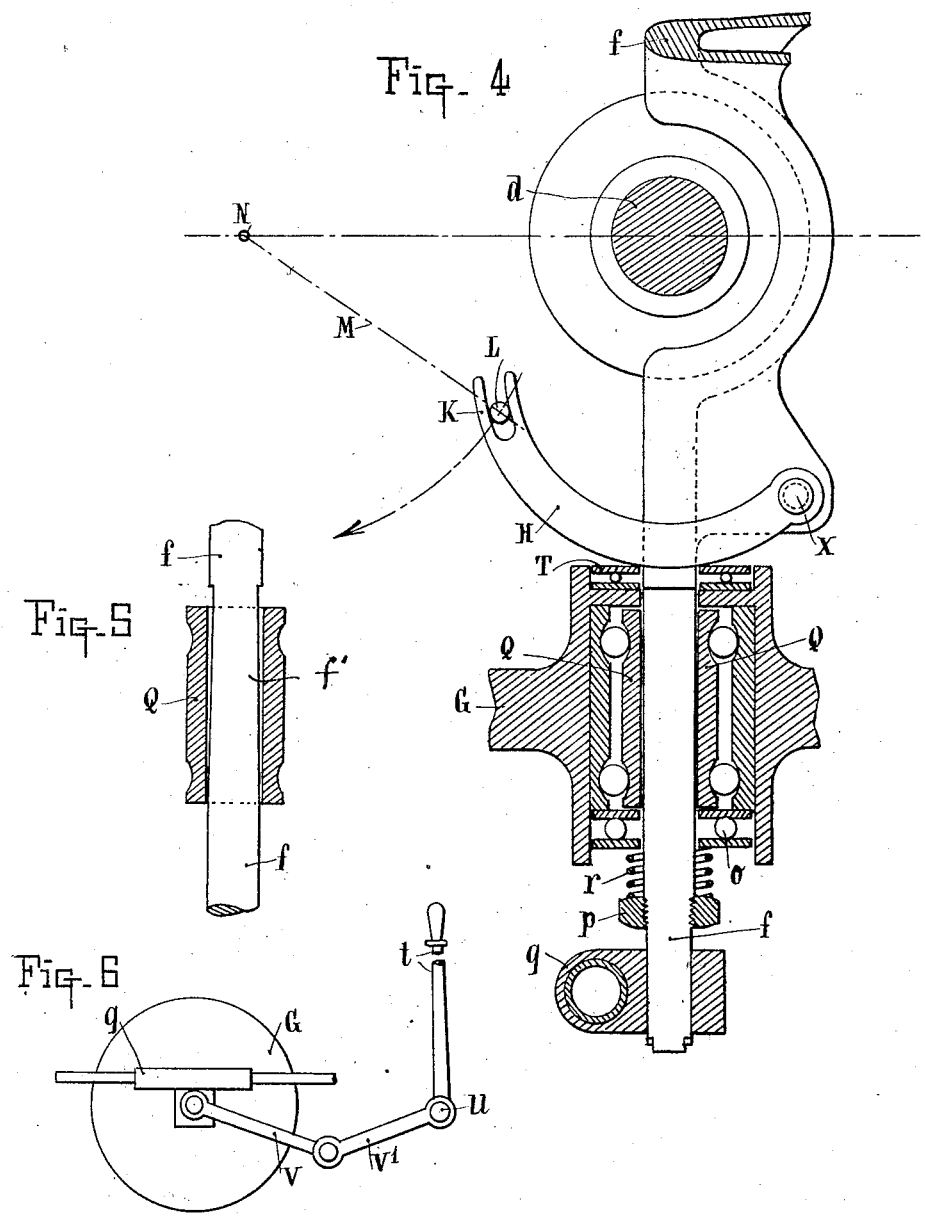

UNITED STATES PATENT OFFICE.

LOUIS CAMILLE ARNAUD, OF FORCALQUIER, BASSES-ALPES, FRANCE.

FRICTIONAL GEARING.

939,653.  Specification of Letters Patent.  Patented Nov. 9, 1909.

Application filed February 24, 1909. Serial No. 479,803.

*To all whom it may concern:*

Be it known that I, LOUIS CAMILLE ARNAUD, a citizen of the Republic of France, residing at Forcalquier, Basses-Alpes, France, have invented a new and useful Frictional Gearing, of which the following is a specification.

This invention relates to a change speed gear device, wherein the speed from one shaft may be transmitted to another shaft, or wherein a shaft may be driven with a speed different from the speed of the driving shaft, or wherein the direction of rotation of the driven shaft may be the same as or opposite to the direction of the driving shaft.

An object of the invention is to provide a device, which allows of almost unlimited variation of the speed of a driven shaft without changing the speed of the driving shaft.

Another object is to arrange these shafts so that their disposition with respect to each other remains unchanged whatever their respective speed may be.

Other objects will be more fully understood from the description in connection with the accompanying drawings and novel features will be more particularly pointed out and ascertained in and by the appended claims.

In the drawings, Figure 1 is a schematical diagram of the main parts of the device. Fig. 2 is a plan view of the device partly in section. Fig. 3 is an elevation of the same partly in section. Fig. 4 is an elevation showing a number of details, partly in section. Fig. 5 is a view of some details partly in section. Fig. 6 is a view of a combination of details.

In Fig. 1 $b$ indicates the driving shaft, and $d$ the driven shaft arranged in line with said driving shaft. $f$ and $h$ indicate shafts in alinement with each other and both at right angles with respect to the shafts $b$ and $d$. Each of said shafts carries a circular member or disk. The disks A and C are rigidly mounted on the driving shaft $b$ and driven shaft $d$ respectively, while the disks E and G are rotatably secured on the shafts $f$ and $h$ respectively. The distance between the driving and driven disks, both of the radius $r$, is indicated with $i$; the disks A and C are in frictional engagement with the disk E at the points $j$ and $k$ respectively; they are also in frictional engagement with the disk G, but as the results obtained from the engagement therewith are not different from those obtained by the engagement with disk E they are not further drawn into consideration. If the driving shaft $b$ makes VA revolutions per second, the velocity of a point at the circumference of the disk A will be $2r\pi VA$. To the joint $j$ of disk E the same speed will be imparted through the frictional engagement, and if the distance of point $j$ from the center of disk E is designated with $l$, then $$2r\pi VA = 2l\pi VE,$$

wherein VE indicates the number of revolutions per second of disk E. The speed of point $k$ on disk E at a distance $m$ of the center will be $2\pi m VE$, and if the driven disk E in point $m$, then disk C engages $$2\pi m VE = 2\pi r VC,$$

wherein VC = the number of revolution per second of the driven disk. From the two equations it follows that $$\frac{VC}{VA} = \frac{m}{l}$$

as for a given speed of the driving shaft the speed of the driven shaft is only dependent upon the ratio of distances of the points of engagement from the center of the disk E. This ratio may be varied by varying the distance $i$ between the driving and driven disk or by shifting the shafts $f$ and $h$ parallel to shafts $b$ and $d$, or by other suitable means.

In the embodiment shown in Figs. 2 and 3, the distance $i$ between disks A and C is kept constant, and means are provided for displacing the shafts of the friction disks parallel to the driving and driven shafts.

The driving disk A is a circular member preferably composed of a plurality of layers of leather, cardboard, fiber etc. and is shown mounted in close proximity to the fly wheel B of the motor. The driven disk C is rigidly secured on shaft $d$, the latter being supported in bearings $n$—$n$. The flat disks E and G are mounted rotatably on the rod $f$, which is provided with a cranked portion, near the shaft $d$. Springs $r$ serve for maintaining the frictional engagement between the disks A and C and E—G. Ball bearings $o$ near each of the disks E—G serve for receiving the thrust resulting from said frictional engagement, and springs $r$ rest with one end against these bearings and with the other end against a nut $p$ which may serve for adjusting the tension of the spring.

A displacement of rod $f$ in direction parallel with shaft $d$ may be effected by means of lever $t$, which is pivotally mounted on a member $u$, and is in rigid connection with arm $v'$. The free end of the arm $v'$ is pivotally connected with rod $v$, which is secured to rod $f$. These elements are preferably arranged at both ends of rod $f$, as shown in Fig. 2. Sockets $q$ conveniently disposed near the nuts $p$ are provided with laterally arranged passages, through which rods S are slidably disposed, which serve for guiding the rod $f$ and the disks E and G in their displacement.

By interrupting the frictional engagement of the disks the driven shaft may be thrown out of gear. One preferred way of obtaining this interruption is shown in Fig. 4.

Two advisably curved members H are pivotally mounted preferably on rod $f$ near the cranked portion thereof. The free end K of these members is bifurcated. A lever M oscillatable about N projects with a pin L into the bight of the bifurcated portion and by oscillating said lever the curved part of the members will press against a ball bearing T, which is in engagement with the hub of the friction disk and it will thereby force said disk out of engagement with the driven and driving disks.

On account of the usually unsymmetrical disposition of the disks A and C with respect to the rod $f$, the forces resulting from the frictional engagement will be directed so, that the friction disks will be somewhat tilted, with respect to the rod $f$. The rod $f$ therefore is provided with a preferably square portion or neck $f'$ which advisably is tapered as shown in Fig. 5. The tapered portion is supported by the ball-bearing Q, so that leeway is provided between said bearing and said neck, and a continuous engagement of the four disks is made possible.

As long as the driven disk is on one side of the rod $f$ and the driving disk on the other side, the driven shaft $d$ will rotate in a direction opposite to that of the driving shaft. For the purpose of coupling the shafts so that they will rotate in the same direction a conical clutch member F is longitudinally slidably mounted on the free end of shaft $d$—which is adapted to enter into a suitably shaped recess of the driving disk. After the friction disks are thrown out of engagement with the driven and driving disks, this clutch F may be moved by means of a suitable lever mechanism, until it engages the said recess or it may be moved by means indicated in Fig. 2. By actuating lever $t$ the cranked portion of rod $f$ will press against a collar slidably mounted on shaft $d$. This collar will move a ball bearing P disposed on the shaft $d$ adjacent to the clutch member F and will press said member into the recess against the tension of spring R, which normally holds said member in inoperative position.

I claim:

1. In a device of the class described, the combination with a driving shaft and a driven shaft, said shafts being in alinement with each other, of a rod perpendicular to said shafts and extending on both sides thereof, a pair of friction disks, rotatably and slidably mounted on said rod, circular members rigidly mounted on each of said shafts and adapted to enter into frictional engagement with said disks, and means for obtaining and interrupting said frictional engagement.

2. In a device of the class described, the combination with a driving shaft and a driven shaft in alinement with each other, of a rod perpendicular to said shafts, a pair of friction disks mounted on said rod, circular members rigidly mounted on each of said shafts and adapted to enter into frictional engagement with said disks, means for moving said rod in a direction parallel to said shafts, means for guiding said rod in said direction and means for obtaining and interrupting said frictional engagement.

3. In a device of the class described, the combination, with a driving shaft and a driven shaft in alinement with each other, of a rod perpendicular to said shafts, a pair of friction disks loosely mounted on said rod, circular members rigidly mounted on said shafts and adapted to enter into frictional engagement with said disks, a lever and means coacting with said lever and said rod for imparting sliding motion to said rod when said lever is actuated.

4. In a device of the class described, the combination, with a driving shaft and a driven shaft in alinement with each other, of a rod perpendicular to said shafts, a pair of friction disks loosely mounted on said rod, circular members rigidly mounted on each of said shafts, and adapted to enter into engagement with said disks, a plurality of oscillatable members adapted to interrupt said engagement and means for actuating said oscillatable members.

5. In a device of the class described, the combination, with a driving shaft and a driven shaft in alinement with each other, of a rod perpendicular to said shafts, a pair of friction disks loosely mounted on said rod, circular members rigidly mounted on said shafts and adapted to enter into engagement with said disks, a plurality of oscillatable members mounted on said rod adapted to interrupt said engagement and means for actuating said members.

6. In a device of the class described, the combination, with a driving shaft and a driven shaft in alinement with each other, of a rod perpendicular to said shafts, a pair of friction disks loosely mounted on said rod, circular members rigidly mounted on said shafts, a curved lever pivotally mounted on said rod and adapted to displace said disks longitudinally on said rod and means for actuating said lever.

7. In a device of the class described, the combination, with a driving shaft and a driven shaft in alinement with each other, of a rod perpendicular to said shafts, a pair of friction disks loosely mounted on said rod, and circular members adapted to engage said friction disks, said friction disks being adapted to be tilted with respect to said rod.

8. In a device of the class described, the combination, with a driving shaft and a driven shaft in alinement with each other, of a rod perpendicular to said shafts, a pair of friction disks, said rod being provided with tapered portions, bearings on said portions and carrying said disks, circular members rigidly mounted on said shafts and adapted to engage said disks, and means for displacing said disks with respect to said circular members.

9. In a device of the class described, the combination, with a driving and a driven shaft in alinement with each other, of a pair of friction disks, circular members rigidly mounted on said shafts and means for obtaining rotation of the driven shaft in the same direction as that of the driving shaft.

10. In a device of the class described, the combination, with a driving and a driven shaft in alinement with each other, of a rod perpendicular to said shafts, a pair of friction disks loosely mounted on said rod, circular members rigidly mounted on said shafts, one of said members being provided with a recess, a clutch member slidably mounted on the driven shaft and adapted to fit in said recess and means coacting with said rod for imparting sliding motion to said clutch member.

11. In a device of the class described, the combination, with a driving and a driven shaft in alinement with each other, of a rod perpendicular to said shafts, a pair of friction disks loosely mounted on said rod, circular members rigidly mounted on said shafts, one of said members being provided with a recess, a clutch member slidably mounted on the driven shaft, and adapted to fit in said recess, means coacting with said rod for imparting sliding motion to said clutch member and means for holding said clutch member normally out of said recess.

In testimony whereof I affix my signature in presence of two witnesses.

LOUIS CAMILLE ARNAUD.

Witnesses:
 VICTOR MATEAU,
 H. C. COXE.